(12) United States Patent
Henssen et al.

(10) Patent No.: US 9,896,586 B2
(45) Date of Patent: Feb. 20, 2018

(54) CUT RESISTANT ARTICLE

(75) Inventors: Giovanni Joseph Ida Henssen, Born (NL); Peto Verdaasdonk, Sittard (NL)

(73) Assignee: DSM IP ASSETS B.V., Heerlen (NL)

( * ) Notice: Subject to any disclaimer, the term of this patent is extended or adjusted under 35 U.S.C. 154(b) by 1031 days.

(21) Appl. No.: 13/640,173

(22) PCT Filed: Apr. 7, 2011

(86) PCT No.: PCT/EP2011/055450
§ 371 (c)(1),
(2), (4) Date: Dec. 18, 2012

(87) PCT Pub. No.: WO2011/124654
PCT Pub. Date: Oct. 13, 2011

(65) Prior Publication Data
US 2013/0125283 A1     May 23, 2013

(30) Foreign Application Priority Data
Apr. 7, 2010  (EP) ..................................... 10159248

(51) Int. Cl.
| | | |
|---|---|---|
| A41D 19/00 | (2006.01) | |
| D06M 15/693 | (2006.01) | |
| C08J 7/04 | (2006.01) | |
| A41D 19/015 | (2006.01) | |
| D03D 1/00 | (2006.01) | |
| C08K 7/14 | (2006.01) | |
| C09D 7/12 | (2006.01) | |
| A41D 31/00 | (2006.01) | |
| C08K 7/04 | (2006.01) | |

(52) U.S. Cl.
CPC ....... *C09D 7/1291* (2013.01); *A41D 19/0065* (2013.01); *A41D 19/0096* (2013.01); *A41D 19/01505* (2013.01); *A41D 31/0055* (2013.01); *C08J 7/047* (2013.01); *D06M 15/693* (2013.01); *C08J 2321/02* (2013.01); *C08K 7/04* (2013.01); *C08K 7/14* (2013.01); *D03D 1/0041* (2013.01); *Y10T 428/269* (2015.01)

(58) Field of Classification Search
CPC ..... D06M 15/693; D06N 3/00; D06N 3/0063; A41D 31/0055; Y10T 428/26; Y10T 428/269; C08K 7/02; C08K 7/04; C08K 7/06; C08K 7/08; C08K 7/10; C08K 7/12; C08K 7/14

USPC ............ 428/292.1, 295.1–301.4, 332, 339; 442/134–135, 148, 152–180; 2/2.5, 159, 2/161.6, 161.7, 161.8, 167, 168
See application file for complete search history.

(56) References Cited

U.S. PATENT DOCUMENTS

| | | |
|---|---|---|
| 4,578,826 A | 4/1986 | Adiletta |
| 5,336,555 A | 8/1994 | Darras et al. |
| 6,021,524 A | 2/2000 | Wu et al. |
| 6,080,474 A | 6/2000 | Oakley et al. |
| 2002/0148785 A1 | 10/2002 | Mitchell et al. |
| 2010/0050309 A1 * | 3/2010 | Marissen ............... D02G 3/442 2/2.5 |
| 2017/0028614 A1 * | 2/2017 | Koike ................... B29C 59/16 |

FOREIGN PATENT DOCUMENTS

| | | | |
|---|---|---|---|
| WO | WO 99/33367 | 7/1999 | |
| WO | WO 2009073530 A1 * | 6/2009 | ....... A41D 19/01505 |

OTHER PUBLICATIONS

Wypych, George. Handbook of Fillers (3rd Edition). ChemTec Publishing. Online version available at: http://app.knovel.com/hotlink/toc/id:kpHFE00001/handbook-fillers-3rd/handbook-fillers-3rd. Mar. 3, 2010. pp. 167-168.*
Starr, T., Glass-Fibre Directory and Databook, Springer Science & Business Media, Dec. 31, 1996, p. 81.*
Lee Effects of Fiber Aspect Ratio, Fiber Content, and Bonding Agent on Tensile and Tear Properties of Short-Fiber Reinforced Rubber) KSME International Journal, vol. 15, No. 1, pp. 35-43, 2001.*
Hearle, J. "High Performance Fibers", 2001, pp. 68-69.*
Wypych, Handbook of Fillers, 2000, pp. 178-179.*
International Search Report for PCT/EP2011/055450 dated May 26, 2011.
Cals, R.H.C., LAPINUS® Technical Paper, Rockforce® RF825-Roxul®1000 Engineered mineral fibres for reinforcement in Thermoplastics (2006).

* cited by examiner

*Primary Examiner* — Frank J Vineis
(74) *Attorney, Agent, or Firm* — Nixon & Vanderhye P.C.

(57) ABSTRACT

The invention relates to an article comprising a cut-resistant coating which contains a polymeric matrix and a cut-resistant component distributed in the polymeric matrix characterized in that said cut-resistant component is a plurality of fibers having an average length (L) to an average diameter (D) ratio, i.e. L/D, of at least 10.

8 Claims, No Drawings

CUT RESISTANT ARTICLE

This application is the U.S. national phase of International Application No. PCT/EP2011/055450 filed 7 Apr. 2011 which designated the U.S. and claims priority to EP 10159248.3 filed 7 Apr. 2010, the entire contents of each of which are hereby incorporated by reference.

The invention relates to an article comprising a cut-resistant coating containing a polymeric matrix and a cut-resistant component distributed in the polymeric matrix. The invention further relates to a method for improving the cut-resistance of an article and to a liquid composition suitable for coating an article.

An article comprising a cut-resistant coating is known for example from U.S. Pat. No. 6,080,474, which discloses polymeric articles such as textiles in the form of protecting garments, particularly gloves. Said articles are coated with an elastomeric cut-resistant coating comprising an elastomer and a hard filler having a Mohs value of at least about 3. The hard filler is in the form of particles, e.g. platelets, needle particles, irregularly-shaped particles and round particles. The advantage of using such a coating is that the cut-resistance of the article, i.e. the resistance of the article against cutting actions or motions, is improved.

It was however observed that the cut-resistance of known articles such as those of U.S. Pat. No. 6,080,474 may be further improved. In particular it was observed that for applications where cutting forces of increased magnitude are encountered the cut-resistance of said articles may still be unsatisfactory.

Therefore, an object of the invention may be to provide coated articles having at least the same cut-resistance as known articles comprising cut-resistant coatings. Another object of the invention may be to provide articles having increased cut-resistance as compared with the cut-resistance of the known articles comprising cut-resistant coatings.

The invention provides an article comprising a cut-resistant coating which contains a polymeric matrix and a cut-resistant component distributed in the polymeric matrix, said cut-resistant component being a plurality of fibers having an average length (L) to an average diameter (D) ratio, i.e. L/D, of at least 10.

It was observed that the article of the invention possesses good cut-resistant properties. It was also observed that the article of the invention is effective in stopping a sharp object, during e.g. a cutting or even slashing motion, since there is a high probability that said sharp object would encounter in its cutting path the fibers forming the cut-resistant component. It was further observed that the article of the invention has a cut-resistance at least similar with that of known articles comprising known cut-resistant coatings. In particular, the article of the invention is resistant against cutting forces of increased magnitude, e.g. cutting forces of between 5 cN and 15 cN (as measured on a Cut Protection Performance, i.e. CPP tester according ASTMF1790-05 standard). The article of the invention is also suitably utilized in application where such cutting forces of increased magnitude are commonly encountered, e.g. in applications for glass and steel industry.

By fiber is herein understood an elongated body whose length is larger than its transversal dimensions, e.g. diameter, width and/or thickness. By plurality of fibers is herein understood that the article of the invention, preferably contains 1-90 volume % of the cut-resistant component relative to the volume of the polymeric matrix, preferably 1-70 vol. %, even more preferably 1-50 vol. %.

In an embodiment of the invention, the article has a cut-resistant coating disposed on at least one surface thereof. Said at least one surface may be partially or fully covered by said coating. It is preferred that the cut-resistant coating is disposed on at least the surface which has the highest probability of being exposed to cutting forces, actions or processes. For example when the article is a glove, the preferred surface of the glove to be coated is at least the surface covering the palm of the hand of the wearer which usually is mostly exposed to cutting actions. Alternatively, said glove can be only knuckle-coated, finger-coated or it may also be that the entire surface of the glove is coated with the cut-resistant coating.

Preferably, said cut-resistant coating is disposed on at least an outer surface of the article of the invention. By an outer surface is herein understood a surface before receiving the cut-resistant coating, which surface is exposed first to a cutting force, cutting action or cutting process. The outer surface of the article of the invention may be partially or entirely covered by the cut-resistant coating. If said outer surface is partially covered by said coating, it is preferred that the covered areas are those exposed most often to cutting actions.

By a cut-resistant coating disposed on at least one surface of the article of the invention is herein understood that the coating covers at least partially said at least one surface. It may also be that depending on the coating process used to deposit said coating onto said surface, part of the coating might also impregnate the article of the invention. The impregnated part may be free of the cut-resistant component or it may contain said cut-resistant component. In a preferred embodiment the cut-resistant coating impregnates the article of the invention wherein the impregnated part is about substantially free of the cut-resistant component and wherein said article is preferably a glove. It was observed that a glove according to such embodiment has an increased comfort and flexibility as well as a longer lifetime, i.e. the coating stability on the glove is increased.

The cut-resistant coating may also be at least partially, however most preferably fully, adhered to said at least one surface of the article of the invention. It was observed that a fully adhered coating has increased stability and prolonged usage compared with partially adhered coatings. The adherence of the cut-resistant coating to said surface can be achieved by using a bonding layer, e.g. a glue, by treating the surface physically, e.g. in a plasma treatment device, and/or chemically, e.g. by grafting onto said surface molecules that would promote the adhesion of the coating. Such methods commonly used to promote the adhesion of coatings to a surface are well known in the art. The adherence of the cut-resistant coating to said surface can also be achieved due to physical forces acting between said coating and said surface.

The cut-resistant coating used in the article of the invention contains a polymeric matrix. Preferred polymeric matrices are those comprising an elastomeric polymer, examples thereof including natural rubber, synthetic rubber and thermoplastic elastomers. Specific examples of suitable elastomeric polymers include, polyvinyl chloride, polyurethane, nitrile rubber, vinyl rubber, polyisoprene, neoprene, chloroprene and silicone. Preferred elastomeric polymers for use in this invention include polyurethane, polyvinyl chloride and silicone rubber. Most preferred elastomeric polymer is a water soluble polyurethane in order to prevent the use of unwanted solvents when manipulating said elastomeric polymers.

Preferably, said cut-resistant coating has an average thickness of at least 0.3 mm, more preferably at least 0.2 mm, most preferably at least 0.1 mm. Said thickness is preferably at most 5 mm, more preferably at most 3 mm, most preferably at most 1 mm. Preferably, the average thickness of the cut-resistant coating on the article of the invention is between 0.1 and 1 mm, more preferably between 0.1 and 0.5 mm, most preferably between 0.1 and 0.3 mm. By thickness of the cut-resistant coating is herein understood the average thickness of said coating as for example measured between the surface of the article supporting said coating and the opposite surface of the coating. When measuring said thickness, the part of said coating which might be eventually impregnated into the article, is not taken into account. The thickness of said coating may be measured with an optical or electronic microscope on cross-sections of said coating. The average thickness can be computed by averaging a multiplicity of thickness values, e.g. 10 values.

In a preferred embodiment of the article of the invention, the cut-resistant component is a hard component having a Mohs Hardness value of at least 2 wherein said hard component is a plurality of hard fibers having an L/D of at least 10. Preferably the hard component has a Mohs Hardness value of at least 3, most preferably of at least 4, most preferably of at least 5. Said hard component is a plurality of hard fibers, which are distributed in the polymeric matrix, which embeds and stabilizes the orientation of said fibers. Suitable examples of hard fibers include fibers chosen out of the group consisting of glass fibers, carbon fibers, mineral fibers, crystalline mineral fibers, metal fibers, metal alloys fibers and ceramic fibers. Most preferred fibers are mineral fibers. Such mineral fibers provide the article of the invention with homogeneous cut-resistant properties, i.e. the article has consistent cut-resistant properties over the surface thereof. Examples of mineral fibers include RB215-Roxul™ 1000 fibers and wollastonite fibers. It was observed that an article according to this embodiment may resist against cutting forces of increased magnitude, e.g. cutting forces of between 5 cN and 15 cN (as measured on a Cut Protection Performance, i.e. CPP tester according to ASTMF1790-05 standard). Such an article may therefore be suitable in applications for glass and steel industry.

In another preferred embodiment of the article of the invention, the cut-resistant component is a plurality of cut-resistant polymeric fibers manufactured from a polymer chosen from the group consisting of polyamides and polyaramides, e.g. poly(p-phenylene terephthalamide) (known as Kevlar®); poly(tetrafluoroethylene) (PTFE); poly{2,6-diimidazo[4,5b-4',5'e]pyridinylene-1,4(2,5-dihydroxy)phenylene} (known as M5); poly(p-phenylene-2, 6-benzobisoxazole) (PBO) (known as Zylon®); poly(hexamethyleneadipamide) (known as nylon 6,6), poly(4-aminobutyric acid) (known as nylon 6); polyesters, e.g. poly(ethylene terephthalate), poly(butylene terephthalate), and poly(1,4 cyclohexylidene dimethylene terephthalate); polyvinyl alcohols; and also polyolefins e.g. homopolymers and copolymers of polyethylene and/or polypropylene. The preferred cut-resistant fibers are polyaramide fibers and high or ultra high molecular weight polyethylene (HMWPE or UHMWPE) fibers. Preferably the HMWPE fibers are melt spun and the UHMWPE are gel spun, e.g. fibers manufactured by DSM Dyneema, NL. It was observed that the article of this embodiment has good flexibility and may provide an increased comfort in case the article is worn such as garments and apparels.

Preferably, the cut-resistant component is distributed homogeneously throughout the entire polymeric matrix, the advantage thereof being that the cut-resistant coating disposed on the article of the invention provides said article with homogeneous cut-resistant properties, i.e. properties that show less variations over the surface of said coating.

In a particular embodiment, said cut-resistant component is distributed within the polymeric matrix of the cut-resistant coating only throughout certain regions of said matrix.

In a preferred embodiment of the article of the invention, the amount of cut-resistant component forms a gradient throughout the thickness of the cut-resistant coating as e.g. disposed on the article of the invention. Preferably, the higher amount of said cut-resistant component is at the contact surface of said cut-resistant coating and the lower amount of said cut-resistant component is at the free surface of said coating. The advantage thereof is that the surface of the coating exposed to the external environment is substantially free of any cut-resistant component and consequently, the surface of an object contacted by the article of the invention will not be damaged by scratching or abrading thereof by said cut-resistant component. This is in particular true when the cut-resistant component is a hard component. It was also observed that such article of the invention is easy to manufacture.

Preferably, the fibers forming the cut-resistant component are randomly oriented in the polymeric matrix of the cut-resistant coating disposed on the article of the invention. The advantage thereof is that the article presents good cut-resistant properties substantially independent from the orientation of the cutting action.

The average diameter (D) of the fibers forming the cut-resistant component may vary within wide ranges, the upper limit thereof being only limited by the thickness of the coating. Preferably, the average diameter of the cut-resistant component is at most 50 microns, more preferably at most 30 microns, most preferably at most 10 microns. Preferably said average diameter of said cut-resistant component is at least 3 microns, more preferably at least 5 microns. It was observed that the article of the invention presented a good flexibility when the fibers forming the cut-resistant component are hard fibers having an average diameter of at most 20 microns, more preferably at most 15 microns, most preferably at most 10 microns. Preferably said average diameter of said hard fibers is at least 1 micron, more preferably at least 3 microns. When the fibers forming the cut-resistant component are cut-resistant polymeric fibers, preferably the average diameter of said cut-resistant polymeric fibers is at most 50 microns, more preferably at most 30 microns. Preferably said average diameter of said cut-resistant polymeric fibers is at least 3 micron, more preferably at least 5 microns. It was observed that the cut resistant properties of the article of the invention improved when larger diameter fibers were used. By average diameter is herein understood the numerical average diameter of the fibers forming the cut-resistant component as computed according to Formula 1.

$$D = \frac{1}{n}\sum_{i=1}^{n} d_i \qquad \text{Formula 1}$$

wherein n is the total number of fibers used to compute the average diameter; usually n=100 randomly picked fibers and $d_i$ is the diameter of the $i^{th}$ fiber.

Preferably, the average length (L) of the fibers forming the cut-resistant component is at most 10000 microns, more preferably at most 5000 microns, most preferably at most 3000 microns. Preferably said average length of said cut-resistant component is at least 50 microns, more preferably at least 100 microns. It was also observed that when the fibers forming the cut-resistant component are hard fibers having an average length of at most 1000 microns, more preferably at most 750 microns, most preferably at most 650 microns the article of the invention and in particular a glove comprising the article of the invention show a good dexterity. Preferably said average length of said hard fibers is at least 50 microns, more preferably at least 100 microns. When the fibers forming the cut-resistant component are cut-resistant polymeric fibers, preferably the average length of said cut-resistant polymeric fibers is at most 10000 microns, more preferably at most 5000 microns, most preferably at most 3000 microns. Preferably said average length of said cut-resistant polymeric fibers is at least 50 microns, more preferably at least 100 microns. By average length is herein understood the weight average length of the fibers forming the cut-resistant component as computed according to Formula 2:

$$L = \sum_{i=1}^{n} w_i l_i \quad \text{Formula 2}$$

wherein w is the normalized weight fraction according to Formula 3:

$$\sum_{i=1}^{n} w_i = 1 \quad \text{Formula 3}$$

and $l_i$, is the length of the $i^{th}$ fiber.

Preferably, at least part of the cut-resistant component has an aspect ratio (L/D) of at most 10000, more preferably at most 5000. Preferably said aspect ratio of said cut-resistant component is at least 12, more preferably at least 15. The average aspect ratio is the ratio between the average length (L) and the average diameter (D) of the cut-resistant component. When the fibers forming the cut-resistant component are hard fibers, preferably at least part of said hard fibers have an average aspect ratio of at least 12, more preferably at least 15, even more preferably at least 18. Said L/D of said hard fibers is preferably at most 1000, more preferably at most 800. When the fibers forming the cut-resistant component are cut-resistant polymeric fibers, preferably at least part of said cut-resistant polymeric fibers have an average aspect ratio of at least 12, more preferably at least 15, even more preferably at least 18. Said L/D of said cut-resistant polymeric fibers is preferably at most 1000, more preferably at most 800. It was observed that by using such cut-resistant components in an article of the invention the cut resistance properties of said article show good homogeneity and in particular without affecting the dexterity and flexibility of the cut-resistant coating. When the article of the invention is a glove, such a glove shows an effective combination of comfort, dexterity and flexibility.

The surface of the fibers forming the cut-resistant component may be modified in order to improve the bond strength between said fibers and the polymeric matrix, e.g. by grafting suitably chosen molecules on the surface of said fibers. Such modification techniques as well as suitable grafting molecules specially chosen in relation to the polymeric matrix and the type of hard or cut-resistant polymeric fiber are known in the art.

The diameter and the aspect ratio of the cut-resistant component may easily be determined by using SEM pictures. For the diameter it is possible to make a SEM picture of the cut-resistant component as such, spread out over a surface and measuring the diameter at 100 randomly selected positions and than calculating the average of the so obtained 100 values. To compute the aspect ratio, the length of hard fibers is measured in the same manner as the diameter thereof. Preferably the SEM pictures are made with backscattered electrons, providing a better contrast between the hard fibers and surface onto which they are spread.

Preferably the fibers forming the cut-resistant component are spun fibers. An advantage of such fibers may be that the diameter of the fibers has a rather constant value or is at least within a certain range. Because of this, there may be no or only a very limited spread in the properties, for example the cut-resistance and/or the abrasion resistance of the article according to the invention. This may even be true when relatively high loads of cut-resistant component are used in cut-resistant coating disposed on the article of the invention, in this way providing an article with excellent cut resistance.

Good examples of spun hard fibers are thin glass or mineral fibers spun by rotation techniques well known to the skilled person. It is possible to produce the hard fibers as continuous filaments that are subsequently milled into hard fibers of much shorter length. Alternatively, discontinuous filaments may be produced by jet spinning, optionally subsequently milled.

When the fibers forming the cut-resistant component are hard fibers, the article of the invention preferably contains 0.1-20 volume % of the hard fibers relative to the volume of the polymeric matrix, preferably 1-10 vol. %, even more preferably 2-7 vol. %. When the fibers forming the cut-resistant component are cut-resistant polymeric fibers, the article of the invention preferably contains 10-80 volume % of the cut-resistant polymeric fibers relative to the volume of the polymeric matrix, preferably 30-70 vol. %, even more preferably 50-70 vol. %.

The article of the invention preferably comprises a textile fiber or a textile yarn, said textile fiber or textile yarn comprising a cut-resistant coating as defined according to the invention, said coating being disposed on the surface of said textile fiber or textile yarn. By textile fiber is herein understood an elongated body whose length is much larger than its transversal dimensions, e.g. diameter, width and/or thickness. Said textile fibers can have a continuous length, known as textile filaments, or a discontinuous length, known as staple textile fibers. Preferably the textile fibers have discontinuous lengths since it was observed that such textile fibers provide articles made therefrom with increased wearing comfort. By textile yarn is herein understood an elongated body containing a plurality of textile fibers. Textile fibers can be manufactured from a variety of materials, suitable examples including natural and synthetic materials. Examples of natural materials suitable as starting materials for manufacturing textile fibers, such textile fibers being referred to herewith as natural textile fibers, include but are not limited to cotton, cellulose, cotton, hemp, wool, silk, jute, sisal, cocos, linen and the like. Examples of synthetic materials suitable as starting materials for manufacturing textile fibers, such textile fibers being referred to herewith as synthetic textile fibers, include but are not limited to polyamides and polyamides, e.g. poly(p-phenylene terephthalamide) (known as Kevlar®); poly(tetrafluoroethylene) (PTFE); poly{2,6-diimidazo[4,5b-4',5'e]pyridinylene-1,4(2,5-dihydroxy)phenylene} (known as M5); poly(p-phenylene-2, 6-benzobisoxazole) (PBO) (known as Zylon®); poly (hexamethyleneadipamide) (known as nylon 6,6), poly(4-aminobutyric acid) (known as nylon 6); polyesters, e.g. poly(ethylene terephthalate), poly(butylene terephthalate), and poly(1,4 cyclohexylidene dimethylene terephthalate); polyvinyl alcohols; but also polyolefins e.g. homopolymers and copolymers of polyethylene and/or polypropylene. It is appreciated that the synthetic materials suitable for manufacturing synthetic textile fibers may be the same as or different than the polymers used to manufacture the cut-resistant polymeric fibers forming the cut-resistant component contained by the cut-resistant coating used in article of the invention.

The preferred natural textile fibers for use according to the invention are cotton staple fibers since an article of the invention comprising such natural textile fibers shows a good combination of comfort and cut resistance. Cotton staple fibers are commonly used to produce textile yarns. In addition to being cost efficient, cotton staple fibers have good absorbency, are comfortable to wear, launder well, and tend to be relatively durable. A further advantage of cotton staple fibers is that such fibers are relatively inexpensive. Preferably, the staple cotton fibers have lengths of at least 20 mm, more preferably 30 mm, the staple cotton fibers being preferably cut to lengths of at most 50 mm, more preferably at most 40 mm.

The preferred synthetic textile fibers for use according to the invention are polyolefin fibers. Preferably said polyolefin fibers are melt spun polyethylene fibers. Also preferred polyolefin fibers are gel-spun ultrahigh molecular weight polyethylene (UHMWPE) fibers. If a melt spinning process is used, the polyethylene starting material used for manufacturing thereof preferably has a weight-average molecular weight between 60,000 and 600,000, more preferably between 60,000 and 300,000. An example of a melt spinning process is disclosed in EP 1,350,868 incorporated herein by reference. If the gel spinning process is used to manufacture said fibers, preferably an UHMWPE is used with an intrinsic viscosity (IV) of preferably at least 3 dl/g, more preferably at least 4 dl/g, most preferably at least 5 dl/g. Preferably the IV is at most 40 dl/g, more preferably at most 25 dl/g, more preferably at most 15 dl/g. Preferably, the UHMWPE has less than 1 side chain per 100 C atoms, more preferably less than 1 side chain per 300 C atoms. Preferably the UHMWPE fibers are manufactured according to a gel spinning process as described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "*Advanced Fibre Spinning Technology*", Ed. T. Nakajima, Woodhead Publ. Ltd (1994), ISBN 185573 182 7.

In a first preferred embodiment, the synthetic textile fiber or the textile yarn containing thereof used in the article of the invention, is a synthetic textile fiber containing a hard filler, said hard filler having a Mohs hardness of preferably at least 2, more preferably at least 4, most preferably at least 4. It was observed that such an article has increased cut-resistance. Preferably, the synthetic material comprised by said synthetic textile fiber is chosen out of the group consisting of aramids, liquid crystalline polymers (LCPs) and polyolefins. More preferably said synthetic material is a polyethylene, most preferably an UHMWPE. Said hard filler may be a metal or a metal alloy, e.g. iron, steel, tungsten and nickel or it may be a non-metallic filler, e.g. aluminum oxide, metal carbides, metal nitrites, metal sulfides, metal silicates, metal silicides, metal sulfates, metal phosphates and metal borides, silicon dioxides and silicon carbides and titanium dioxides. Preferably, the hard filler is in a particulate form, e.g. flat or elongated particles (needles) and have an average diameter of between 0.05 and 20 microns, more preferably between 0.05 and 5 microns. Examples of fibers including such hard fillers and processes of manufacturing thereof are given in U.S. Pat. Nos. 6, 127,028; 6,126,879 and 6,021,524, which are included herein by reference. Most preferably, said synthetic fiber is a polyethylene fiber containing a hard filler in the form of hard fibers, said hard fibers having an average diameter of at most 25 microns and preferably having an aspect ratio of at least 3. Preferably, the amount of said hard fibers in the polyethylene fiber is between 0.1 and 20 volume %. An example of such yarn and a process for manufacturing thereof are given in WO2008/046476.

In a second, more preferred embodiment, the article of the invention comprises a textile fabric, also simply referred to herein as fabric, said fabric comprising a cut-resistant coating as defined according to the invention, said coating being disposed on the surface of said fabric. The fabric may be of any construction known in the art, e.g. woven, knitted, plaited, braided or non-woven or combinations thereof. Woven fabrics may include plain weave, rib, matt weave and twill weave fabrics and the like. Knitted fabrics may be weft knitted, e.g. single- or double-jersey fabric or warp knitted. An example of a non-woven fabric is a felt fabric. Further examples of woven, knitted or non-woven fabrics as well as the manufacturing methods thereof are described in "*Handbook of Technical Textiles*", ISBN 978-1-59124-651-0 at chapters 4, 5 and 6, the disclosure thereof being incorporated herein as reference. A description and examples of braided fabrics are described in the same Handbook at Chapter 11, more in particular in paragraph 11.4.1, the disclosure thereof being incorporated herein by reference. Preferably the fabric is a knitted fabric, more preferably a woven fabric, even more preferably the woven fabric is constructed with a small weight per unit length and overall cross-sectional diameter. It was observed that such a fabric shows a low weight per unit coverage surface area and increased degree of flexibility and softness. The fabric is preferably manufactured from the textile natural and/or synthetic fibers and/or textile yarns mentioned hereinabove. Preferably, said fabric is manufactured from textile fibers chosen from the group consisting of cotton fiber, aramid fibers, polyolefin fibers, polyethylene fibers and synthetic fibers containing a hard filler, each and every enumerated fiber being defined together with preferred embodiments thereof hereinabove. Preferably said fabric is manufactured from cotton fibers, most preferably from polyethylene, e.g. UHMWPE, fibers.

In a third, more preferred embodiment, the article of the invention comprises a glove manufactured from a textile fabric, preferably a textile fabric according to the second more preferred embodiment of the article of the invention defined hereinabove, said glove comprising a cut-resistant coating as defined according to the invention, said coating being disposed on at least part of the surface of said glove.

The invention further relates to a liquid composition suitable for coating an article such as an article of the invention, said composition comprising a polymeric material and a dispersion of a cut-resistant component in said polymeric material characterized in that said component is a plurality of fibers having an average length to average diameter ratio of at least 10. Preferably, said fibers are cut-resistant polymeric fibers being manufactured from polymeric materials and having a D, an L and/or an L/D as defined hereinabove. More preferably, said fibers are hard fibers having a Mohs Hardness value of at least 2, more preferably of at least 3, more preferably at least 4, even more preferably at least 5. Preferably the hard fibers have an average diameter of at most 20 microns, more preferably at most 15 microns, most preferably at most 10 microns.

Preferably said average diameter is at least 1 micron, more preferably at least 3 microns. Preferably the hard fibers have an average length of at most 1000 micrometers (μm), more preferably at most 750 μm, most preferably at most 650 μm. Preferably said average length is at least 50 microns, more preferably at least 100 microns. Preferably at least part, i.e. at least 50 wt % of the hard fibers, more preferably at least 80 wt % of the hard fibers have an average aspect ratio (L/D) of at least 10, more preferably at least 15, even more preferably at least 20. The surface of the hard fibers may also be modified in order to improve the bond strength between said fibers and the polymeric matrix.

The invention also relates to a cut-resistant coating obtainable by a process where the liquid composition of the invention is formed into a coating. In particular the invention relates to a cut-resistant coating as defined hereinabove in the embodiments of the invention, said coating comprising a polymeric matrix and a cut-resistant component distributed in the polymeric matrix, said cut-resistant component being a plurality of fibers having an average length (L) to an average diameter (D) ratio, i.e. L/D, of at least 10.

The invention further relates to a method of improving the cut-resistance of an article, comprising depositing onto an outer surface of said article a cut-resistant coating, said coating comprising a polymeric matrix and a cut-resistant component distributed in said polymeric matrix, said cut-resistant component being a plurality of hard fibers having an average length to average diameter ratio of at least 10, more preferably at least 15, most preferably at least 20.

In an embodiment of the method of the invention, the cut-resistant coating is deposited from the liquid composition of the invention onto a surface, preferably an outer surface of the article of the invention. Preferably, said liquid composition is a solution of the polymeric matrix in a suitable solvent, said solution containing also a dispersion of the cut-resistant component. Said liquid composition may also be a melt of the polymeric matrix said melt further containing a dispersion of the cut-resistant component. By dispersion of the cut-resistant component is herein understood that the fibers forming said cut-resistant component are distributed in the solution or melt, respectively, preferably said fiber being substantially homogenously distributed throughout the solution or the melt, respectively. Such dispersion may be obtained by adding the hard fiber to the solution of the polymeric matrix directly, at any stage of the preparation of the solution, or by first dispersing the hard fiber in a solvent, optionally containing stabilizers, after which it is added at any stage to the preparation of the solution of the polymeric matrix. In the case of the liquid composition being a melt, the fibers may be mixed with the base material of the polymeric matrix, after which it is subjected to higher temperature to yield the melt. In a different embodiment, the fibers may be added to a melt of the polymeric material. The advantage of using such a liquid composition is that the article of the invention may contain a cut-resistant coating comprising a homogeneous distribution of the cut-resistant component.

In another embodiment of the method of the invention, the deposition of the cut-resistant coating on the article of the invention comprises the steps of (i) pre-coating the outer surface of the article of the invention with a cut-resistant component to form a pre-coat; and subsequently (ii) coating the pre-coated outer surface of said article with a polymeric matrix by forcing said matrix through the cut-resistant component, wherein said cut-resistant component is a plurality of hard fibers having an average length to average diameter ratio of at least 10, more preferably at least 15, most preferably at least 20. The pre-coat may be deposited for example from a concentrated liquid composition comprising fibers and optionally a binding agent, preferably said composition comprising at least 60 wt %, more preferably at least 80 wt % of fibers. The binding agent may be for example an adhesive. Preferably said agent comprises the same polymeric material as the polymeric matrix that is subsequently applied. More homogeneous cut resistant properties were obtained when the fibers forming the cut-resistant component were randomly oriented in the pre-coat. Subsequently to the pre-coating step (i), the polymeric matrix is forced through the plurality of the fibers forming the cut-resistant component during a coating step (ii). Depending on the amount of the polymeric matrix which is forced through the plurality of said fibers, an article of the invention may be obtained wherein the amount of fibers in the cut-resistant coating forms a gradient throughout the thickness of said coating.

The invention also relates to the use of a plurality of fibers with properties and dimensions as detailed hereinabove in a cut-resistant coating. It was observed that articles containing said cut-resistant coating show good cut-resistance.

The following examples and comparative experiments illustrate but do not limit the present invention.

Measuring Methods

Cut-resistance of a coating was measured in accordance with ASTM F1790. In this test, a sample of a dried coated article was placed on the flat surface of a mandrel. A series of tests was carried out in which a razor blade loaded with a variable weight was pulled across the coating sample until the sample was cut all the way through. The distance the razor blade traveled across the sample until the blade cut completely through the sample was measured. The point at which the razor blade cut through the sample was the point at which electrical contact was made between the mandrel and the razor blade. The distance required to make the cut was measured as a function of load on the razor blade and normalized to a load of 1000 grams.

COMPARATIVE EXAMPLE

Gloves made of 100% cotton yarn were coated with a polyester-based aqueous aliphatic polyurethane coating L9010 (available from Govi N.V. Belgium) by dipping glove in a 35 wt.% dispersion of the coating and drying for 10 minutes at 100° C.

Cut resistance was measured according to the method described above and was 28.96 mm/1000 gr (average for 10 measurements).

EXAMPLE 1

Gloves were coated as in the Comparative Example with the exception that a mineral fiber was added to the coating dispersion in an amount of 12.5 wt. % in relation to the total solid content. The mineral fibers have an average length of 230 micron (mass weighed average) and an average diameter of 9 micron (mass weighed average). Thus L/D is 25.6. The mineral fibers are sold under the trade name Rockbrake Roxul® RB220ELS from Lapinus.

Cut resistance was measured according to the method described above and was 87.81 mm/1000 gr (average for 10 measurements).

The above examples show that addition of the cut-resistant component to the matrix significantly increases the cut resistance of the gloves.

The invention claimed is:

1. An article having an outer surface, the article comprising:
    a woven fabric, and
    a cut-resistant coating disposed at least partially on the outer surface of the article, wherein
    the cut-resistant coating comprises a polymeric matrix and a cut-resistant component distributed in the polymeric matrix, and wherein
    the cut-resistant component is a plurality of hard cut-resistant mineral fibers having a Mohs hardness of at least 4, and an aspect ratio L/D of an average length (L) to an average diameter (D) of the fibers of at least 10, with the average diameter (D) of the cut-resistant component being between 5 and 50 microns, and wherein
    the outer surface of the article is a surface of the article before receiving the cut-resistant coating which is exposed first to a cutting force, cutting action or cutting process, and wherein
    the article has a resistance against cutting forces of a magnitude between 5 cN and 15 cN as measured on a Cut Protection Performance (CPP) tester according to ASTMF1790-05 standard.

2. The article of claim 1, wherein the cut-resistant coating comprises 0.1-20 volume % of the cut-resistant component relative to a volume of the polymeric matrix.

3. The article of claim 1, wherein the article is a glove.

4. The article of claim 1, wherein the polymeric matrix comprises an elastomeric polymer selected from the group consisting of natural rubber, synthetic rubber and thermoplastic elastomers.

5. The article of claim 1, wherein the cut-resistant coating has an average thickness which is at least 0.3 mm.

6. The article of claim 1, wherein the hard fibers are spun mineral fibers.

7. The article of claim 1, wherein the average length (L) of the cut resistant fibers is at most 10000 microns.

8. The article of claim 1, wherein at least part of the cut-resistant fibers have an aspect ratio (L/D) of at most 10000.

* * * * *